(12) United States Patent
Ismail

(10) Patent No.: US 7,454,184 B2
(45) Date of Patent: Nov. 18, 2008

(54) DC OFFSET CANCELLATION IN A WIRELESS RECEIVER

(75) Inventor: Aly M. Ismail, Costa Mesa, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 441 days.

(21) Appl. No.: 10/725,767

(22) Filed: Dec. 2, 2003

(65) Prior Publication Data

US 2005/0118975 A1   Jun. 2, 2005

(51) Int. Cl.
*H04B 1/10* (2006.01)

(52) U.S. Cl. ............... 455/296; 455/230; 455/341; 455/299; 455/310; 455/334

(58) Field of Classification Search ............. 455/296, 455/230, 232, 299, 310, 334, 341, 307
See application file for complete search history.

(56) References Cited

U.S. PATENT DOCUMENTS

| | | | | |
|---|---|---|---|---|
| 4,290,036 A | * | 9/1981 | Moulding et al. | 333/215 |
| 4,387,337 A | * | 6/1983 | Beeman | 324/557 |
| 5,034,994 A | * | 7/1991 | Muterspaugh et al. | 455/326 |
| 5,869,986 A | * | 2/1999 | Haque et al. | 327/61 |
| 5,933,062 A | * | 8/1999 | Kommrusch | 333/193 |
| 6,026,286 A | * | 2/2000 | Long | 455/327 |
| 6,125,325 A | * | 9/2000 | Kohli | 701/213 |
| 6,167,246 A | * | 12/2000 | Elder et al. | 455/313 |
| 6,184,747 B1 | * | 2/2001 | Helgeson et al. | 327/552 |
| 6,198,765 B1 | * | 3/2001 | Cahn et al. | 375/142 |
| 6,285,865 B1 | * | 9/2001 | Vorenkamp et al. | 455/307 |
| 6,714,099 B2 | * | 3/2004 | Hikita et al. | 333/133 |
| 6,906,584 B1 | * | 6/2005 | Moffat et al. | 330/69 |
| 7,076,225 B2 | * | 7/2006 | Li et al. | 455/245.1 |
| 2004/0235445 A1 | * | 11/2004 | Gomez | 455/307 |

\* cited by examiner

*Primary Examiner*—Nay Maung
*Assistant Examiner*—Richard Chan

(57) ABSTRACT

A DC-offset cancellation system for a wireless receiver is disclosed. The DC-offset cancellation system comprises an amplifier and an impedance inverter configured to transform inductance applied to a received signal to a capacitance.

14 Claims, 3 Drawing Sheets

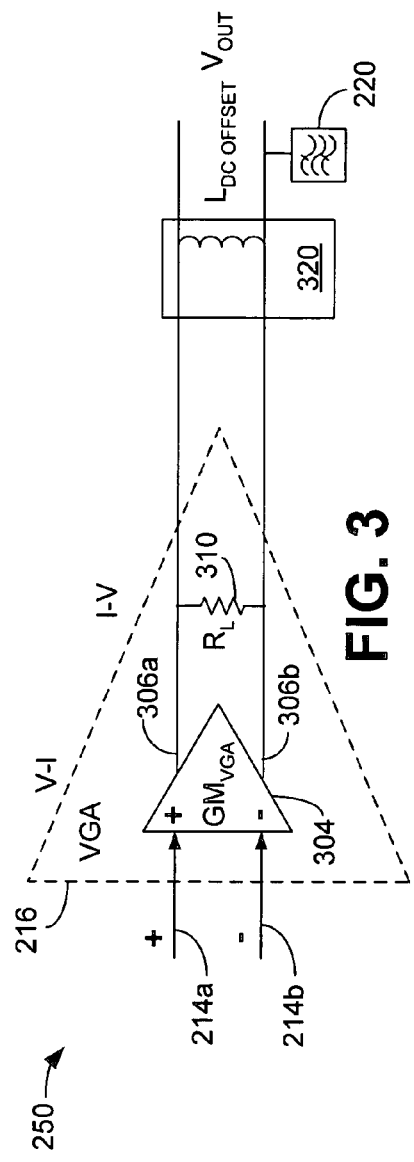
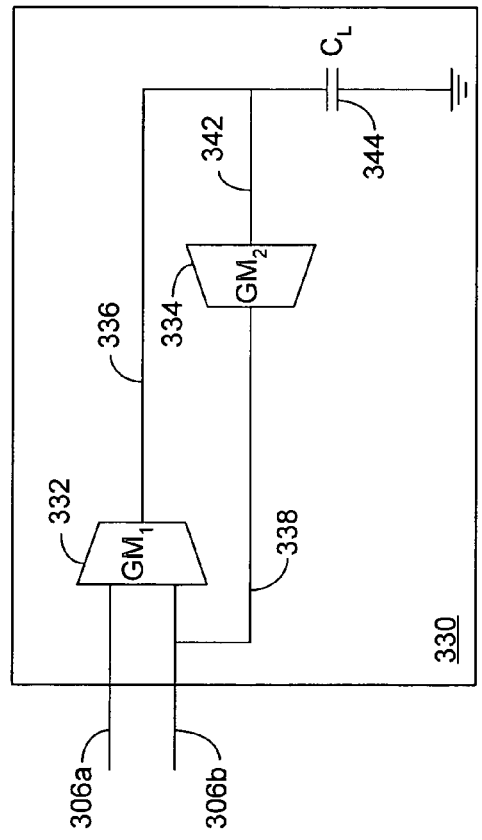
FIG. 3
FIG. 4

DC OFFSET CANCELLATION IN A WIRELESS RECEIVER

BACKGROUND OF THE INVENTION

1. Field of the Invention

This invention relates generally to receiver circuit architecture in a wireless portable communication device. More particularly, the invention relates to DC offset cancellation in a wireless receiver.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems have been developed and deployed, many different standards, to which these systems must conform, have evolved. For example, in the United States, third generation portable communications systems comply with the IS-136 standard, which requires the use of a particular modulation scheme and access format. In the case of IS-136, the modulation scheme can be 8-quadrature phase shift keying (8QPSK), offset π/4 differential quadrature phase shift keying (π/4-DQPSK) or variations thereof and the access format is TDMA.

In Europe, the global system for mobile communications (GSM) standard requires the use of the gaussian minimum shift keying (GMSK) modulation scheme in a narrow band TDMA access environment, which uses a constant envelope modulation methodology.

Furthermore, in a typical GSM mobile communication system using narrow band TDMA technology, a GMSK modulation scheme supplies a very low noise phase modulated (PM) transmit signal to a non-linear power amplifier directly from an oscillator. In such an arrangement, a non-linear power amplifier, which is highly efficient, can be used thus allowing efficient modulation of the phase-modulated signal and minimizing power consumption. Because the modulated signal is supplied directly from an oscillator, the need for filtering, either before or after the power amplifier, is minimized. Further, the output in a GSM transceiver is a constant envelope (i.e., a non time-varying signal containing only a phase modulated (PM) signal) modulation signal.

One of the advances in portable communication technology is the move toward the implementation of a low intermediate frequency (IF) receiver and a direct conversion receiver (DCR). A low IF receiver converts a radio frequency (RF) signal to an intermediate frequency that is lower than the IF of a convention receiver. A direct conversion receiver downconverts a radio frequency (RF) received signal directly to baseband (DC) without first converting the RF signal to an intermediate frequency (IF). One of the benefits of a direct conversion receiver is the elimination of costly filter components used in systems that employ an intermediate frequency conversion. For example, in a conventional code division multiple access (CDMA) communication system, one or more surface acoustic wave (SAW) filters are implemented to aid in converting the RF signal to an IF signal. To further complicate the circuitry, these SAW filters are typically located on a different device (i.e., "off-chip") than many of the receiver components.

When implementing a low IF or a direct conversion receiver, there is typically some amount of offset (referred to as "DC offset") that appears on the downconverted signal. The DC offset occurs due to filter mismatch and also due to self-mixing that can occur with the local oscillator (LO) signal, the radio frequency (RF) signal or interfering signals in the receiver. Typically, filter mismatch due to temperature change over time results in static DC offset. Self-mixing among the LO, RF and interfering signals, as well as reflection at the antenna, temperature variation and LO leakage result dynamic DC offset. Correction for DC offset is typically performed on the variable gain amplifier (VGA) located in the receiver. Many techniques have been proposed to minimize DC-offset. For example, it is possible to minimize DC offset using digital calibration techniques in the analog-to-digital converter (A/D) located in the receiver. Alternately, sampling techniques and Sample-and-Hold (S/H) circuits have been used to subtract the estimated offset of the variable gain amplifier from the received signal.

Unfortunately, one or all of these techniques can only be applied to a system in which the receiver does not continuously operate, such as in a TDMA communication system. In a CDMA system, these techniques will not be effective because the receiver works continuously with no interruption. Furthermore, DC-offset correction using so called "auto-zeroing" techniques during start-up is not practical in a CDMA system because of dynamic offsets. In a CDMA system the only option that shows promise is the implementation of a so called "servo-loop" like architecture around the variable gain amplifier.

Unfortunately, in a servo-loop architecture, the high pass cut-off frequency is dependent upon the gain characteristics of the variable gain amplifier and the amplifiers in the servo-loop. Because the transconductance of the variable gain amplifier varies significantly with the applied gain control signal (usually above 50 dB of range), the cut-off frequency varies by more than 50 dB, which places the cut-off frequency at a point at which data carried in the received signal will likely be lost. It is possible to adjust the high pass cut-off frequency by varying the gain of the amplifiers in the servo-loop inversely proportional to the transconductance amplification of the VGA. Since the transconductance amplification of the VGA varies proportionally to the exponential of the control voltage, the amplification of the amplifiers in the servo-loop must vary with the inverse of the exponential of the control voltage. Unfortunately, such a servo-loop increases significantly the complexity, power consumption and the area on the device occupied by the architecture.

Therefore, it would be desirable to provide DC offset cancellation in a wireless receiver operating in a communication system in which the receiver operates continuously.

SUMMARY

Embodiments of the invention include a DC-offset cancellation system comprising an amplifier, and an impedance inverter configured to transform inductance applied to a received signal to a capacitance. The impedance inverter may be implemented as an inductance at the output of the amplifier. In another embodiment, the impedance inverter may be implemented using a pair of transconductance amplifiers and a capacitance configured to invert the impedance of the signal at the output of the amplifier.

Related methods of operation are also provided. Other systems, methods, features, and advantages of the invention will be or become apparent to one with skill in the art upon examination of the following figures and detailed description.

It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 3 is a schematic diagram illustrating the filter chain of FIG. 2.

FIG. 4 is a schematic diagram illustrating the implementation of the impedance inverter of FIG. 3.

DETAILED DESCRIPTION

Although described with particular reference to a portable transceiver, the DC-offset cancellation system can be implemented in any communication device employing a direct conversion receiver and in which the receiver operates continuously.

The DC-offset cancellation system can be implemented in hardware, software, or a combination of hardware and software. When implemented in hardware, the DC-offset cancellation system can be implemented using specialized hardware elements and logic. When the DC-offset cancellation system is implemented partially in software, the software portion can be used to control the components so that various operating aspects can be software-controlled. The software can be stored in a memory and executed by a suitable instruction execution system (e.g., a microprocessor). The hardware implementation of the DC-offset cancellation system can include any or a combination of the following technologies, which are all well known in the art: discreet electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the DC-offset cancellation system comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
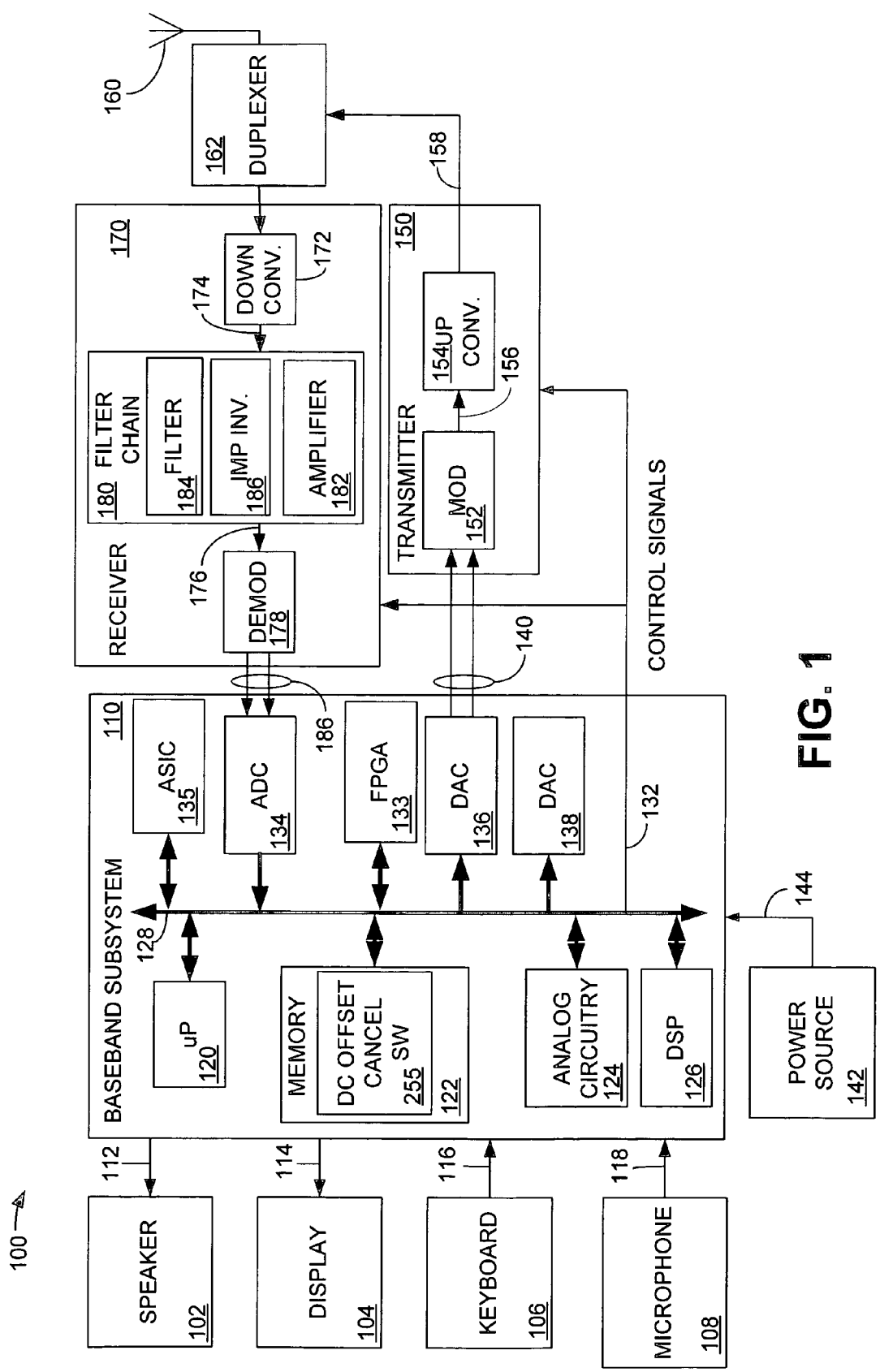
FIG. 1 is a block diagram illustrating a simplified portable transceiver including a DC offset cancellation system in accordance with the invention.

FIG. 1 is a block diagram illustrating a simplified portable transceiver 100 including a low-noise filter for a direct conversion receiver. Portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication device such as a mobile cellular-type telephone. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (µP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the DC-offset cancellation system to be described below is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to transmitter 150 and receiver 170 via connection 132. Although shown as a single connection 132, the control signals may originate from the DSP 126, the ASIC 135, the FPGA 133, or from microprocessor 120, and are supplied to a variety of connections within the transmitter 150 and the receiver 170. It should be noted that, for simplicity, only the basic components of portable transceiver 100 are illustrated herein. The control signals provided by the baseband subsystem 110 control the various components within the transmitter 150 and the receiver 170.

If portions of the DC-offset cancellation system are implemented in software that is executed by the microprocessor 120, the memory 122 typically will also include the DC-offset cancellation software 255. The DC-offset cancellation software 255 comprises one or more executable code segments that can be stored in the memory and executed in the microprocessor 120. Alternatively, the functionality of the DC-offset cancellation software 255 can be coded into the ASIC 135 or can be executed by the FPGA 133. Because the memory 122 can be rewritable and because F the FPGA 133 is reprogrammable, updates to the DC-offset cancellation software 255 can be remotely sent to and saved in the portable transceiver 100 when implemented using either of these methodologies.

Baseband subsystem 110 also includes analog-to-digital converter (ADC) 134 and digital-to-analog converters (DACs) 136 and 138. Although DACs 136 and 138 are illustrated as two separate devices, it is understood that a single digital-to-analog converter may be used that performs the function of DACs 136 and 138. ADC 134, DAC 136 and DAC 138 also communicate with microprocessor 120, memory 122, analog circuitry 124 and DSP 126 via bus 128. DAC 136 converts the digital communication information within baseband subsystem 110 into an analog signal for transmission to a modulator 152 via connection 140. Connection 140, while shown as two directed arrows, includes the information that is to be transmitted by the transmitter 150 after conversion from the digital domain to the analog domain.

The transmitter 150 includes modulator 152, which modulates the analog information in connection 140 and provides a modulated signal via connection 156 to upconverter 154. The upconverter 154 transforms and amplifies the modulated signal on connection 156 to an appropriate transmit frequency and power level for the system in which the portable transceiver 100 is designed to operate. Details of the modulator 152 and the upconverter 154 have been omitted for simplicity, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed.

The upconverter 154 supplies the upconverted signal via connection 158 to duplexer 162. The duplexer comprises a filter pair that allows simultaneous passage of both transmit signals and receive signals, as known to those having ordinary skill in the art. The transmit signal is supplied from the duplexer 162 to the antenna 160.

A signal received by antenna 160 will be directed from the duplexer 162 to the receiver 170. The receiver 170 includes a downconverter 172, a filter chain 180 constructed in accordance with an aspect of the invention, and a demodulator 178. The downconverter 172 includes a low-noise amplifier (LNA) (not shown) and circuitry (not shown) to convert the received signal from an RF level to a baseband level (DC). The DC level signal is sent to the filter chain 180 via connection 174. The filter chain comprises a least one filter stage comprising an amplifier 182, a filter 184 and an impedance converter 186. The operation of the amplifier 182, filter 184 and the impedance converter 186 will be described in detail below.

The demodulator 178 recovers the transmitted analog information and supplies a signal representing this information via connection 186 to ADC 134. ADC 134 converts these analog signals to a digital signal at baseband frequency and transfers the signal via bus 128 to DSP 126 for further processing.

Figure 2:
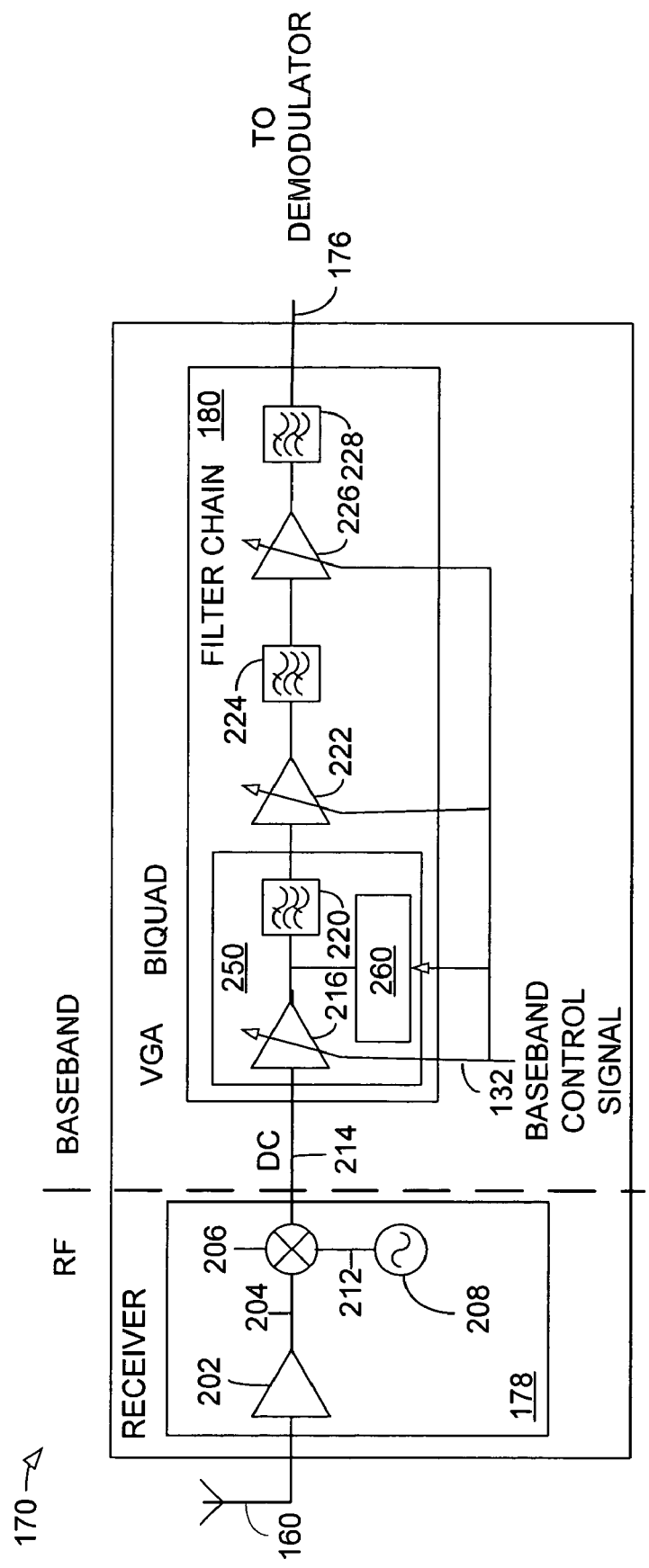
FIG. 2 is a block diagram illustrating the receiver of FIG. 1.

FIG. 2 is a block diagram illustrating, in greater detail, the receiver 170 of FIG. 1. The receiver 170 receives a signal via antenna 160, which supplies the received signal at an RF frequency level via the duplexer (not shown) to low noise amplifier (LNA) 202. The LNA 202 amplifies the received signal and provides the amplified signal on connection 204 to the mixer 206. The mixer 206 receives a frequency reference signal, also called a "local oscillator" signal, or "LO," from a synthesizer 208, via connection 212. The LO signal determines the frequency to which the mixer 206 downconverts the signal received from LNA 202 via connection 204. In the case of a direct conversion receiver, the mixer 206 downconverts the received RF signal to a DC signal on connection 214.

When converted to baseband, the DC signal on connection 214 likely includes undesirable DC offset. If the DC offset is not corrected, then the offset will migrate through the filter chain 180 and be amplified, thereby corrupting the received signal. The signal on connection 214 is then supplied to the filter chain 180. The filter chain 180 comprises at least one filter stage 250. The filter stage 250 comprises a variable gain amplifier (VGA) 216 and a filter 220. The filter 220 can be referred to as a so-called "bi-quad" filter because of it's configuration to generate complex poles and zero's. The amplifier 216 and the filter 220 represent the amplifier 182 and the filter 184, respectively, of FIG. 1. The filter stage 250 also includes an impedance inverter 260, which corresponds to the impedance inverter 186 of FIG. 1. If implemented partially in software, the impedance inverter 260 receives one or more control signals via connection 132. Although illustrated using a plurality of amplifiers and filters, the filter chain 180 may comprise a single filter stage, depending upon the specific application in which the receiver 170 is used.

The DC signal on connection 214 is supplied to variable gain amplifier 216. The variable gain amplifier 216 receives a control signal via connection 132 from the baseband subsystem 110 (FIG. 1). The variable gain amplifier 216 amplifies the signal on connection 214, and supplies the amplified signal to the filter 220. The filter 220 filters the signal to provide the desired signal output. If the filter chain 180 includes additional filter stages, then the output of the filter 220 is supplied to a subsequent variable gain amplifier 222 and filter 224. The amplification and filtering continues until the signal is supplied via connection 176 to the demodulator 178 for further processing.

FIG. 3 is a schematic diagram illustrating, in further detail, the filter stage 250 of FIG. 2. The variable gain amplifier 216 is depicted as a transconductance amplifier 304 (referred to as having the characteristic $GM_{VGA}$) and a load resistance ($R_L$) 310. The load resistance 310 represents the resistive load of the transconductance amplifier 304. The transconductance amplifier 304 represents the transconductance amplification provided by the variable gain amplifier 216. The transconductance amplifier 304 receives a differential input on connections 214a and 214b. The input on connections 214a and 214b likely includes a DC-offset. The output of the transconductance amplifier 304 on connections 306a and 306b also forms the output ($V_{OUT}$) of the filter stage 250. A filter 220 is coupled to the output $V_{OUT}$.

The transconductance amplifier 304 performs a voltage-to-current (V-I) conversion and the load resistance 310 performs a current-to-voltage (I-V) conversion. The inductance $L_{DC\ OFFSET}$ 320 represents the inductance at the output of the variable gain amplifier 216 and determines the high pass cut-off frequency of the filter stage 250. In accordance with one embodiment of the invention, the high pass cut-off frequency is a function of the value of the resistance $R_L$ 310 and the value of the inductance $L_{DC\ OFFSET}$ 320, and is no longer a function of the transconductance amplification $GM_{VGA}$ of the transconductance amplifier 304. However, if implemented using a conventional inductor, the value, and therefore, the physical size, of the inductance $L_{DC\ OFFSET}$ would likely be prohibitively large. Therefore, an active circuit implementation simulates the function of the inductance $L_{DC\ OFFSET}$ 320.

FIG. 4 is a schematic diagram illustrating the inductance of FIG. 3 simulated by implementing an impedance inverter, such as the impedance inverter 260 of FIG. 2. The impedance inverter is implemented using what is referred to as a "gyrator-generated," or "gyrator-C" inductance. The gyrator-generated inductance 330 includes a pair of transconductance amplifiers 332 and 344. The transconductance amplifier 332 has differential inputs and is characterized by $GM_1$. The transconductance amplifier 334 comprises a single input and is characterized by $GM_2$.

The input to the transconductance amplifier 332 is provided by connections 306a and 306b. The output of the transconductance amplifier 332 is supplied via connection 336 to the input of the transconductance amplifier 334 and to the load capacitance $C_L$ 344. The output of the transconductance amplifier 334 is supplied on connection 338 to the inverting input of the transconductance amplifier 332. The transconductance amplifiers 332 and 334 are each a voltage controlled current source that, in conjunction with the load capacitor $C_L$ 344, performs an impedance inversion on the signal on connections 306a and 306b and transform the inductance $L_{DC\ OFFSET}$ 320 to a capacitance.

The DC offset correction is applied at the output of the variable gain amplifier 216 using a gyrator-generated inductance. Placing the inductance 320 at the output of the variable gain amplifier adds a high pass filter pole in the transfer function of the variable gain amplifier 216. The inductance 320 shunts any excess DC current (the DC offset) present at the output of the transconductance amplifier 304 to ground. At frequencies above the high pass cut-off frequency, the inductance 320 appears as a high-impedance and the variable gain amplifier 216 functions normally. An advantage to this implementation is that the DC offset correction is applied at the output without interfering with the function of the variable gain amplifier 216 or with the operation of an automatic gain control circuit (not shown). The high pass cut-off frequency is given by:

$$w_c = \frac{R_L}{L_{DCOFFSET}} = \frac{GM_1 * GM_2 * R_L}{C_L} \quad \text{(Eq. 1)}$$

where $w_c$ is the frequency of interest, $R_L$ is the value of the load resistance 310, $L_{DC\ OFFSET}$ is the value of the inductance 320, $GM_1$ is the transconductance amplification of the amplifier 332, $GM_2$ is the transconductance amplification of the amplifier 334, and $C_L$ is the value of the capacitance 344. Clearly, the transconductance gain of the variable gain amplifier 216 is out of the equation, so the high-pass pole does not vary with the control voltage supplied to the transconductance amplifier 304. This implementation solves the problem found in the above-mentioned servo-loop based realization, and results in a simpler, more compact and more power efficient implementation.

Another advantage of the gyrator-inductance implementation is that the noise generated from the DC-offset circuitry is added at the output of the amplifier 216 instead of at the input. Therefore, the noise at the input to the variable gain amplifier 216 input is minimized. In addition, in a transistor-level implementation, the transconductance amplifier 334 ($GM_2$) is the PFET (p-type field effect transistor) load or (p-type-n-type-p-type) PNP in bipolar junction transistor (BJT) technology, which already exists at the output of the variable gain amplifier 216. Accordingly, there is no additional noise contribution from the impedance inverter 330. In other words, the PFET (or PNP) transistors of the output load of the variable gain amplifier 216 are used as the transconductance amplifier 334 ($GM_2$) to minimize the circuitry and minimize additional noise.

If implemented partially in software, control signals supplied via connection 132 (FIGS. 1 and 2) may be used to switch the capacitance $C_L$ 344 and to control the value of the transconductance amplifiers 332 and 334 so that the high-pass cut-off frequency of the gyrator-generated inductance 330 can be controlled.

While various embodiments of the invention have been described, it will be apparent to those of ordinary skill in the art that many more embodiments and implementations are possible that are within the scope of this invention. For example, an equivalent inductance at the output of the VGA can be implemented using other active impedance converters. Accordingly, the invention is not to be restricted except in light of the attached claims and their equivalents.

What is claimed is:

1. A method for filtering a received signal in a wireless receiver, comprising:
   providing a received signal to a multiple-stage baseband filter chain located between a downconverter and a demodulator, the multiple-stage baseband filter chain comprising an input, variable gain amplifiers and an output;
   inverting the impedance of the received baseband signal in a first stage of a multiple-stage baseband filter chain using an inductance applied at an output of a first stage variable gain amplifier, the baseband filter chain arranged such that a feedback path is located between an output of a first transconductance amplifier and an input of the first transconductance amplifier, the feedback path including a second transconductance amplifier; and
   applying a bi-quad filter.

2. The method of claim 1, wherein inverting the impedance of the received signal at the output of the first stage variable gain amplifier comprises using a voltage controlled current source to transform the inductance applied to the received signal to a capacitance.

3. The method of claim 2, further comprising implementing the voltage controlled current source as a pair of transconductance amplifiers.

4. The method of claim 3, further comprising inserting a capacitance at the output of the filter chain.

5. A low-noise baseband filter for a wireless receiver, comprising:
   a multiple-stage filter chain, a first stage of the multiple-stage filter chain comprising:
      an amplifier;
      an impedance inverter applied at the output of the amplifier and configured to transform inductance applied to a received baseband signal to a capacitance, the impedance inverter arranged such that a feedback path is located between an output of a first transconductance amplifier and an input of the first transconductance amplifier, the feedback path including a second transconductance amplifier; and
      a bi-quad filter coupled to the output of the impedance inverter.

6. The low-noise baseband filter of claim 5, wherein the impedance inverter further comprises:
   at least one capacitance coupled to the output of one of the first and second transconductance amplifiers.

7. The low-noise filter of claim 6, wherein the impedance inverter removes direct current (DC) offset present at the input of the amplifier.

8. A portable transceiver, comprising:
   a modulator configured to receive and modulate a data signal;
   an upconverter configured to receive the modulated data signal and provide a radio frequency (RF) signal;
   a transmitter configured to transmit the RF signal; and a direct conversion receiver having a baseband filter chain including an amplifier, a bi-quad filter and an impedance inverter configured to transform inductance applied to a received signal to a capacitance, the impedance inverter having a feedback path located between an output of a first transconductance amplifier and an input of the first transconductance amplifier, the feedback path including a second transconductance amplifier.

9. The portable transceiver of claim 8, wherein the impedance inverter further comprises:
at least one capacitance coupled to the output of the first transconductance amplifier.

10. The portable transceiver of claim 9, wherein the impedance inverter removes direct current (DC) offset present at the input of the amplifier.

11. A system for removing direct current (DC) offset from a received signal, comprising:
a variable gain amplifier configured to amplify a downconverted representation of a received radio frequency (RF) signal to generate an amplified baseband signal; and
a gyrator-generated inductance applied at the output of the variable gain amplifier in a first stage of a multiple-stage baseband filter chain, the gyrator-generated inductance configured to transform inductance present at the output of the variable gain amplifier to a capacitance, the gyrator-generated inductance and the variable gain amplifier arranged such that the amplified baseband signal is not applied at an input of the variable gain amplifier, the gyrator-generated inductance implemented via a first transconductance amplifier having differential inputs and a second transconductance amplifier having a single input.

12. The system of claim 11, wherein the gyrator-generated inductance adds a high pass filter pole that is not a function of the transconductance of the variable gain amplifier.

13. The system of claim 11, wherein the gyrator-generated inductance shunts excess DC current present at the output of the variable gain amplifier to ground.

14. The system of claim 11, wherein, at a frequency above a high-pass cutoff frequency, the gyrator-generated inductance appears as a high impedance at the output of the variable gain amplifier.

* * * * *